US006586036B1

(12) United States Patent
Guraya

(10) Patent No.: US 6,586,036 B1
(45) Date of Patent: Jul. 1, 2003

(54) PROCESS FOR INCREASING THE RATE OF HYDRATION OF FOOD CROP SEEDS

(75) Inventor: Harmeet S. Guraya, New Orleans, LA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 169 days.

(21) Appl. No.: 09/758,663

(22) Filed: Jan. 11, 2001

(51) Int. Cl.⁷ ................................................ A23L 1/182
(52) U.S. Cl. ...................... 426/627; 426/483; 426/518; 426/618; 426/629
(58) Field of Search ................................. 426/627, 629, 426/483, 518, 618

(56) References Cited

U.S. PATENT DOCUMENTS

| | | | |
|---|---|---|---|
| 3,157,514 A | | 11/1964 | Gorozpe |
| 4,133,898 A | | 1/1979 | Carlson et al. |
| 4,357,864 A | | 11/1982 | Salete-Garces |
| 4,385,074 A | | 5/1983 | Weibye |
| 4,582,713 A | * | 4/1986 | Hirokawa et al. .......... 426/233 |
| 5,213,831 A | * | 5/1993 | Leggott et al. ............. 426/241 |

FOREIGN PATENT DOCUMENTS

| | | | |
|---|---|---|---|
| JP | 62111652 | * | 5/1987 |
| JP | 31735448 | * | 7/1988 |

OTHER PUBLICATIONS

Bienvenido O. Juliano et al., *Rice: Chemistry and Technology*, 1985, pp. 17–19, 36–37, 51 & 156–158, published by The American Association of Cereal Chemists, Inc., St. Paul, Minnesota, USA.

* cited by examiner

*Primary Examiner*—Helen Pratt
(74) *Attorney, Agent, or Firm*—John D. Fado; Randall E. Deck

(57) ABSTRACT

A process for significantly increasing the rate of hydration of food crop seeds, such as brown and wild rice, without loss of the nutritious and beneficial portions of the seeds, is disclosed. In this process, the seed of interest is bombarded with an abrasive particulate, which is preferably entrained in a pressurized stream of gas, sufficient to create microperforations in the water resistant outer coat of said seed. These microperforations in the treated seed significantly increase the rate of hydration of the seed and hence decrease cooking time accordingly. Moreover, this process effects improved hydration without removing any significant portions of the outer coat or layers of the seed which lie underneath the outer coat.

30 Claims, No Drawings

PROCESS FOR INCREASING THE RATE OF HYDRATION OF FOOD CROP SEEDS

BACKGROUND OF THE INVENTION

1. Field of the Invention

The invention relates to a novel process for increasing the rate of hydration of food crop seeds, particularly for the dry instantization of rice.

2. Description of Related Art

The demand by consumers for fast cooking food products has continued to increase in recent years. However, a number of food crop seeds such as brown rice, wild rice and beans require long cooking times, due in large part to their slow rate of hydration. Consequently, the consumption of these food crop seeds has been significantly limited in the United States.

A number of instant or quick-cooking rice and vegetable products have been developed and are currently available. Generally, instant or quick-cooking rice products are prepared by first hydrating and/or precooking raw rice, and subsequently drying the treated rice to a desired moisture content. These methods of instantization require significant amounts of water and energy, adding additional cost to the product and often affecting product quality. Moreover, most of these processes have been developed for production of white rice from which the bran layers have been removed. Relatively few quick-cooking brown or wild rice products have been developed. Because the bran layers contain most of the nutrients in the rice grain, the development of quick-cooking brown and wild rice products acceptable to the consumer would be highly desirable. In one process described by Gorozpe (U.S. Pat. No. 3,157,514), whole grain, brown or white milled rice are first pretreated to create fissures or cracks in the rice grain by heating. The fissured rice is then hydrated, cooked to partially gelatinize the starch, cooled and dried. Other processes for the preparation of quick-cooking brown or wild rice include those described by Carlson et al. (U.S. Pat. No. 4,133,898) and Weibye (U.S. Pat. Nos. 4,677,907 and 4,385,074). However, despite these advances, there remains a need for improved methods for preparing quick-cooking rice and other food crop seed products at less expense.

SUMMARY OF THE INVENTION

I have now discovered a novel process for significantly increasing the rate of hydration of food crop seeds without loss of the nutritious and beneficial portions of the seeds. In this process, the seed of interest is bombarded with an abrasive particulate sufficient to create microperforations in the water resistant outer coat of the seed. Alternatively, the seeds may be propelled toward and impacted against an abrasive surface to create the microperforations in the water resistant outer coat. These microperforations in the treated seed significantly increase the rate of hydration of the seed and hence decrease cooking time accordingly. Moreover, this process effects improved hydration without removing any significant portions of the water resistant outer coat or layers of the seed which lie underneath the coat.

In accordance with this discovery, it is an object of this invention to provide a dry process for significantly increasing the rate of hydration of food crop seeds.

Another object of this invention is to provide a process for increasing the rate of hydration of food crop seeds while leaving nutritious and beneficial portions of the seeds substantially intact.

Yet another object of this invention is to provide a process for the dry instantization of rice without hydration or cooking, while leaving the bran layers substantially intact.

Other objects and advantages of this invention will become readily apparent from the ensuing description.

DETAILED DESCRIPTION OF THE INVENTION

For a number of food crop seeds, the time required to hydrate the seeds, such as prior to or during cooking, may be exceptionally long. The process of the invention described herein significantly increases the rate of hydration of food crop seeds, consequently reducing their associated cooking time. In contrast to previously described processes, the process of this invention may be conducted as a dry process, and does not require hydration, cooking, or heating. While the process is preferably used for the treatment of dehulled (i.e. dehusked) cultivated brown rice or wild rice, particularly strains of *Oryza sativa* L. and *O. glaberrima* Steud., it may also be used for the treatment of other food seed crops of interest, including but not limited to beans, soybeans, wheat, oats and corn. As defined herein, dehulled rice refers to a quantity of rice grains which have been dehulled to an extent such that more than or equal to 90% of the grains are dehulled. In the preferred embodiment, more than or equal to about 99% of the rice grains are dehulled. Dehulling may be conducted using conventional techniques.

In a first embodiment, the food crop seed described above is bombarded with a high velocity abrasive particulate which is propelled against the target seed under conditions and for a period of time effective to scarify the seed by creating microperforations (i.e., nicks, holes or cuts) in the water resistant outer layer(s). However, the outer layer(s) are not abraded away, but remain substantially intact on the seed. The second, alternative embodiment is predicated upon the same principle although the roles of the bombarding material and the material impacted are reversed. In this second embodiment, the seeds are propelled at a high velocity and directed against an abrasive surface effective for creating the microperforations in the water resistant layers upon impact therewith.

In either of the first or second embodiments, the bombarding particle (i.e., the abrasive particulate or seed, respectively) are preferably propelled by entrainment in a high velocity gaseous flowstream. However, the bombarding particles may also be propelled mechanically as described in greater detail hereinbelow.

Food crop seeds typically consist of an embryo and endosperm surrounded by one or more relatively tough, water resistant layers, the pericarp and the seed coat or testa. In rice, the embryo and endosperm of the grain are surrounded, in order from the outermost to innermost layers, by the hull, pericarp, seed coat, nucellus and aleurone. Removal of the hull by dehulling exposes the brown rice, also referred to as the caryopsis. The remaining outer four layers of the brown rice, the pericarp, seed coat, nucellus and aleurone, comprise the bran layers of the rice grain and are high in nutrients, with the aleurone layer being particularly high in protein and lipid bodies. However, the pericarp, seed coat and nucellus, which are collectively referred to as the caryopsis coat, each contain a cuticle and are nearly impermeable to water when intact. In accordance with this invention, exposure of dehulled brown rice or wild rice to the abrasive particulates produces microperforations through the pericarp which may also extend through one or more or all of the underlying layers of the caryopsis coat and the aleurone to expose the endosperm. However, this treatment does not remove a substantial portion of the bran layers, but rather the bran layers remain substantially (defined herein as more than 50%, by weight) intact on the rice grains. In the preferred embodiment, more than or equal to approximately 80% by weight of the bran layers remain on the treated rice grains. In other words, the bran layers, and particularly the aleurone layer, remain on the rice grain. Although the pericarp, being the outermost layer, may be partially abraded or eroded away, a substantial portion thereof. (as defined above) remains on the grain. For treatment of other food crop seeds, it is understood that the treatment of this invention may be effective for creating microperforations in the pericarp and/or seed coat to the same extent.

A variety of materials may be used herein as the abrasive particulate. Suitable abrasive particulates should have sharp or angular edges or surfaces and are preferably harder than the seed being treated, although softer particulates may be effective when propelled at higher velocities. The optimal particulate selected will therefore vary with the particular seed being treated and the treatment conditions, particularly the velocity of the particle (including the pressure or velocity of an entraining gas stream), and may be readily selected by the skilled practitioner by routine experimentation. Examples of abrasive particulates which may be used include, but are not limited to, silicas, clays, sand, kaolinite, plastics, metals, diatomaceous earth, extruded or ground plant products such as wild rice chits, rice hulls, corn husks or nut shells, and preferably particulate food grade materials such as parboiled rice flour, spices, salt, sugar and cereal grain flour. The use of such food grade particulate materials is preferred to simplify or even obviate the need for further processing after the scarification to separate the abrasive particulate from the seed. Use of sand or other non-food grade particulates will generally require a subsequent washing or rinsing step to remove the particulate from the treated seed.

The size of the abrasive particulate will also vary with the treatment conditions, particle density, and the type of seed. In general, for any specific particulate, the efficiency of the abrading or scarification is reduced when using very large sizes, particularly those greater than about $200\mu$, increasing the treatment time necessary to achieve effective microperforation of the seeds. Although particulates greater than $200\mu$ may be used, even up to about $1,000\mu$, the efficiency of the process decreases significantly. Conversely, very small particulates (i.e., less than $10\mu$), may lack sufficient mass to be effective under most conditions, requiring exceptionally high velocities to effectively scarify the seeds. Therefore, suitable particulate sizes are typically greater than or equal to about $10\mu$, and less than or equal to about $1,000\mu$, and preferably between about $10\mu$ and $200\mu$. In a preferred embodiment for the treatment of rice, the particulate size will be between about 50 to 150 $\mu$, particularly between about 100 to $150\mu$, and most preferably between about $120–130\mu$. The skilled practitioner will recognize that when using volumes of sand, processed food particulates such as flour, or other ground or extruded materials, the size of individual particles within the volume are variable. For these particulates, the sizes are typically expressed as a mesh size, with the particles being capable of passing through an art recognized mesh size opening. Consequently, particles of sizes smaller than those described above as preferred or suitable may be present in the bombarding stream. Nonetheless, the mesh size will typically be selected such that the mesh opening substantially corresponds to or is slightly larger than the suitable or preferred particle sizes described herein.

The apparatus used for the treatment of the seeds in accordance with this invention is not critical, and any device capable of propelling the bombarding particle at a high velocity will be effective. Preferred devices include those capable of producing high pressure or velocity gas streams with a particulate feed such that the particle may be entrained into the stream. Without being limited thereto, the gas streams may be generated using high pressure pumps, blowers or fans. In a particularly preferred embodiment, the treatment is typically effected using a conventional sandblaster directed at the seeds. The treatment conditions, including entraining gas pressure or velocity, and the duration of the treatment will vary with the seed being treated and the desired particulate, and are selected to effectively scarify the seed without removing water resistant outer layers as described above. Optimal conditions and time may be readily determined by the skilled practitioner. When using small, highly abrasive particulates such as fine grain sand for bombarding seeds with relatively soft outer coats, the gas pressure may need only be great enough to pick up and entrain the particulates in the gas stream to be effective. Conversely, the pressure should not be so high that the outer layers of the seeds are substantially or completely removed. The treatment of seeds such as beans which have harder coats, may require higher pressure or velocity gas flowstreams. Without being limited thereto, suitable gas pressures of the sandblaster will therefore vary with the seed and particulate, and may be between about 20 to 10,000 psig. For the treatment of rice and other relatively soft seeds, the gas pressure of the sandblaster is preferably between about 20 to 200 psig, more preferably between about 40 to 120 psig, and particularly between about 60 to 80 psig. Virtually any gas may be used for the entraining gas stream, although air, and particularly low humidity air, are preferred.

Alternatively, rather than entraining the particles in a high velocity or high pressure gas stream, the particles may be mechanically propelled. The particular device selected is not critical and any device capable of propelling the particle (abrasive particulate or seed) as described above may be suitable for use herein. For instance, suitable devices include but are not limited to high speed conveyor belts or wheels positioned to dispense the particles carried thereon toward the target, rotating cylinders with pick-up brushes or impellers effective for propelling the particles upon contact therewith, and pairs of parallel, closely spaced, oppositely rotating cylinders having a particle feed into the space therebetween, which space is selected to contact and promote passage and propulsion of particles at high velocity.

In an optional yet preferred embodiment, the seeds to be treated may be placed upon an inclined, or rocking or vibrating support. Alternatively, an agitator or stirrer may be provided to mechanically move the seeds on the support. In this embodiment, during treatment the seeds will therefore roll or move, exposing different sides thereof to the abrasive particulates and therefore not limiting scarification to only one side of the seeds. Use of screen or mesh supports, having a mesh size sufficient to allow passage of the abrasive particulates but not the seeds, are particularly preferred for ease of separation of the particulate from the seed.

Following treatment, the scarified seeds may be further processed to remove the abrasive particulate therefrom. Suitable methods include but are not limited to washing or rinsing with a liquid such as water, or blowing with a gas stream.

In an alternative embodiment, the seed to be treated is propelled and directed against an abrasive surface under conditions and for a period of time effective for creating the microperforations in the water resistant outer coat of the seed. Like the first embodiment, the outer layer(s) of the seed are not abraded away but remain substantially intact upon the seeds above. The seeds may be propelled using the same techniques as described above, although in the preferred embodiment, the seeds are entrained in a high pressure or velocity gaseous flowstream. Suitable velocities or pressures of the entraining gas flowstream may vary with different seeds, although the minimum pressure or velocity will typically be somewhat higher than described in relation to the first embodiment in view of the greater size and mass of the seeds. However, as described in the first embodiment, optimal conditions, including the pressure or velocity of the entraining gas flowstream and the abrasive surface, may be readily determined by the skilled practitioner by routine experimentation.

The equipment used for generation of the high pressure or velocity gas flowstream and bombarding the seeds upon the abrasive surface is not critical. As described above, the generation of the high pressure or velocity flowstream may be effected, for example, with conventional high pressure pumps, blowers or fans. The seed may be fed into a conduit, duct or channel transporting the flowstream whereupon it may be directed at the abrasive surface. A variety of abrasive surfaces may also be used, and include but are not limited to a surface having any of the above-described abrasive particulates adhered thereon, sandpaper, or the surface itself may be constructed of an abrasive material, such as conventional grinding or cutting blades.

Scarified seeds produced by any of the above-mentioned processes are suitable for use as a fast-hydrating or fast cooking food crop seed product. Optionally, the seeds may be further treated to improve appearance and/or further decrease cooking times. For instance, treated rice grains may be optionally shined by mechanical rubbing or oil treatment to improve appearance. The scarified rice may also be cooked in water and dried, to produce an instant rice capable of cooking in even shorter times. Cooking and drying techniques which are conventionally used to prepare various commercial quick-cooking or instant rices are suitable for use herein. However, the long soaking periods required in those conventional processes may now be omitted.

The following example is intended only to further illustrate the invention and is not intended to limit the scope of the invention, which is defined by the claims.

EXAMPLE 1

Materials and Methods

Long grain, dehulled brown and wild rice was purchased from local stores. Sand (black and white), salt and parboiled rice flour were bought through different sources for use as abrasive particulates in bombarding the rice. Black sand was obtained in a coarse (Starblast®) and fine (Starblast®XL) grade from Dupont. White sand was obtained from Manley Brothers in 70 and 120 average mesh size. Flour salt was obtained from Cargill Salt Co. which had an average particle size of about 120 mesh. This type of salt is cracked between drums and therefore has sharp edges. Parboiled broken rice was obtained from Riviana and passed twice through a pin mill to obtain similar particle size by feel.

120 gram samples of each of the above-mentioned rice types were placed on a U.S. standard 12 mesh screen, and placed below another 8 mesh screen. The screen size was selected so that rice would not fall through the bottom screen. Air at high pressure (approx. 90 psig) carrying sand, salt or parboiled rice flour at high velocity was directed towards the rice in the screen. The screen was held at an angle and agitated, such that the exposure to the particles in the air and the turbulence resulting from the air pressure moved the rice grains in the inclined corner. Thus, all sides of the rice were randomly exposed to the particles.

Results and Discussion

Preliminary experiments were done with black sand. Brown rice was exposed to coarse and fine grade Dupont sand for 5 sec, 10 sec, 20 sec, 30 sec, 1 min, 2 min and 4 min at approximately 90 psig. Use of coarse grade sand required 1 min of exposure to the sandblasting to reduce the cook time of the brown rice to 15 min. In contrast, only 20 sec of exposure to fine sand was necessary to achieve the same effect. Without wishing to be bound by theory, it is believed that the smaller particles of the fine sand can cut, nick, pit or indent the surface more effectively than coarser sand. Unfortunately, use of black sand imparted a greyish color to rice due to the interaction between some of the oil on the rice surface with the mineral in sand.

White sand (120 mesh) obtained from Manley Brothers was used to bombard the brown and wild rice for 15 sec and 30 sec and was found to be extremely effective in maintaining color and also improving rehydration and reducing cook time. Again, less exposure time was required for smaller particle size (120 mesh) and 70 mesh sand was not as effective.

Sandblasting of the brown and the wild rice at 90 psig had noticeable marks on the rice grains and also appeared to remove a significant portion of the outer layer. We then hypothesized that if the air pressure was reduced to a point that it only resulted in nicks, cuts, pits and indentation but did not remove a substantial amount of the bran layers then we should not be able to observe nicks, cuts, pits and indentation to the outside by naked eye. We therefore used the 120 mesh white sand and reduced the air pressure to a point where it would start picking up the sand particle. This produced the desired effect without losing any of the bran layers. The treated product had the appearance of the untreated product to the naked eye. Microperforations in the outer layers of the brown rice grains were only apparent upon microscopic examination, while microperforations in the wild rice could only be seen by the naked eye with great difficulty.

The process described above was repeated with salt and finely ground parboiled flour used as the abrasive. particulates for sandblasting rather than the white sand. Use of these food grade particulates poses no residue problem. When salt and flour were used, wild rice required more exposure time (1–1.5 min) in comparison to brown rice (25 sec) to effect suitable microperforation of the grains.

It is understood that the foregoing detailed description is given merely by way of illustration and that in modifications and deviations may be made therein without departing from the spirit and scope of the invention.

I claim:

1. A process for increasing the rate of hydration of a food crop seed which comprises a water resistant outer coat, said process comprising bombarding said food crop seed with an abrasive particulate for a period of time and under conditions effective for creating microperforations in the water resistant outer coat of said seed, without removing a substantial portion of said outer coat or the seed underlying said coat.

2. The process of claim 1 wherein said food crop seed is selected from the group consisting of dehulled rice, beans, soybeans, wheat, oats and corn.

3. The process of claim 2 wherein said food crop seed is dehulled rice and said water resistant outer coat comprises the pericarp, seed coat and nucellus, such that said rice is bombarded with said abrasive particulate for a period of time and under conditions effective for creating microperforations in one or more of said pericarp, seed coat and nucellus of said rice without removing a significant portion of the bran layers therefrom.

4. The process of claim 3 wherein said dehulled rice is selected from the group consisting of brown rice, wild rice and mixtures thereof.

5. The process of claim 1 wherein said abrasive particulate is entrained in a moving stream of gas.

6. The process of claim 5 wherein said moving stream of gas is a pressurized stream.

7. The process of claim 6 wherein the pressure of said pressurized stream is between about 20 to 10,000 psig.

8. The process of claim 7 wherein the pressure of said pressurized stream is between about 20 to 200 psig.

9. The process of claim 1 wherein said food crop seed is a bean and said water resistant coat comprises the seed coat.

10. The process of claim 1 wherein said abrasive particulate is a particulate food grade material.

11. The process of claim 1 wherein said abrasive particulate is selected from the group consisting of parboiled rice flour, spices, salt, sugar and cereal grain flour.

12. The process of claim 1 wherein said abrasive particulate is selected from the group consisting of silicas, clays, sand, plastics, metals and diatomaceous earth.

13. The process of claim 12 wherein said abrasive particulate is selected from the group consisting of sand, kaolinite and diatomaceous earth.

14. The process of claim 1 wherein said particles are between about 10 to 1,000 $\mu$.

15. The process of claim 14 wherein said particles are between about 50 to 150 $\mu$.

16. The process of claim 1 further comprising removing said abrasive particulate from said seed following said bombarding.

17. The process of claim 16 wherein said abrasive particulate is removed by rinsing said seed with a liquid.

18. The process of claim 16 wherein said abrasive particulate is removed by exposing said seed to a stream of moving air.

19. A process for increasing the rate of hydration of rice which comprises a pericarp, said process comprising bombarding dehulled rice with abrasive particulate for a period of time and under conditions effective for creating microperforations in the pericarp of said rice without removing a substantial portion of the pericarp therefrom.

20. The process of claim 19 wherein said rice is selected from the group consisting of brown rice, wild rice and mixtures thereof.

21. The process of claim 19 wherein said abrasive particulate is entrained in a moving stream of gas.

22. A process for increasing the rate of hydration of a food crop seed which comprises a water resistant outer coat, said process comprising propelling said food crop seed against an abrasive surface for a period of time and under conditions effective for creating microperforations in the water resistant outer coat of said seed, without removing a substantial portion of said outer coat or the seed underlying said coat.

23. The process of claim 22 wherein said food crop seed is selected from the group consisting of dehulled rice, beans, soybeans, wheat, oats and corn.

24. The process of claim 23 wherein said food crop seed is dehulled rice and said water resistant outer coat comprises the pericarp, seed coat, and nucellus, such that said rice is propelled against said abrasive surface for a period of time and under conditions effective for creating microperforations in one or more of said pericarp, seed coat, and nucellus of said rice without removing a substantial portion of said pericarp, seed coat, and nucellus therefrom.

25. The process of claim 24 wherein said dehulled rice is selected from the group consisting of brown rice, wild rice and mixtures thereof.

26. The process of claim 22 wherein said food crop seed is entrained in a moving stream of gas.

27. The process of claim 22 wherein said food crop seed is a bean and said water resistant coat comprises the seed coat.

28. A process for increasing the rate of hydration of rice which comprises a pericarp, said process comprising propelling dehulled rice against an abrasive surface for a period of time and under conditions effective for creating microperforations in the pericarp of said rice without removing a substantial portion of the pericarp therefrom.

29. The process of claim 28 wherein said rice is selected from the group consisting of brown rice, wild rice and mixtures thereof.

30. The process of claim 28 wherein said rice is entrained in a moving stream of gas.

* * * * *